Oct. 9, 1956
J. P. POMPETTI ET AL
2,765,986
PHOTO-TRANSISTOR CONTROL SYSTEM
Filed July 11, 1955
3 Sheets-Sheet 1
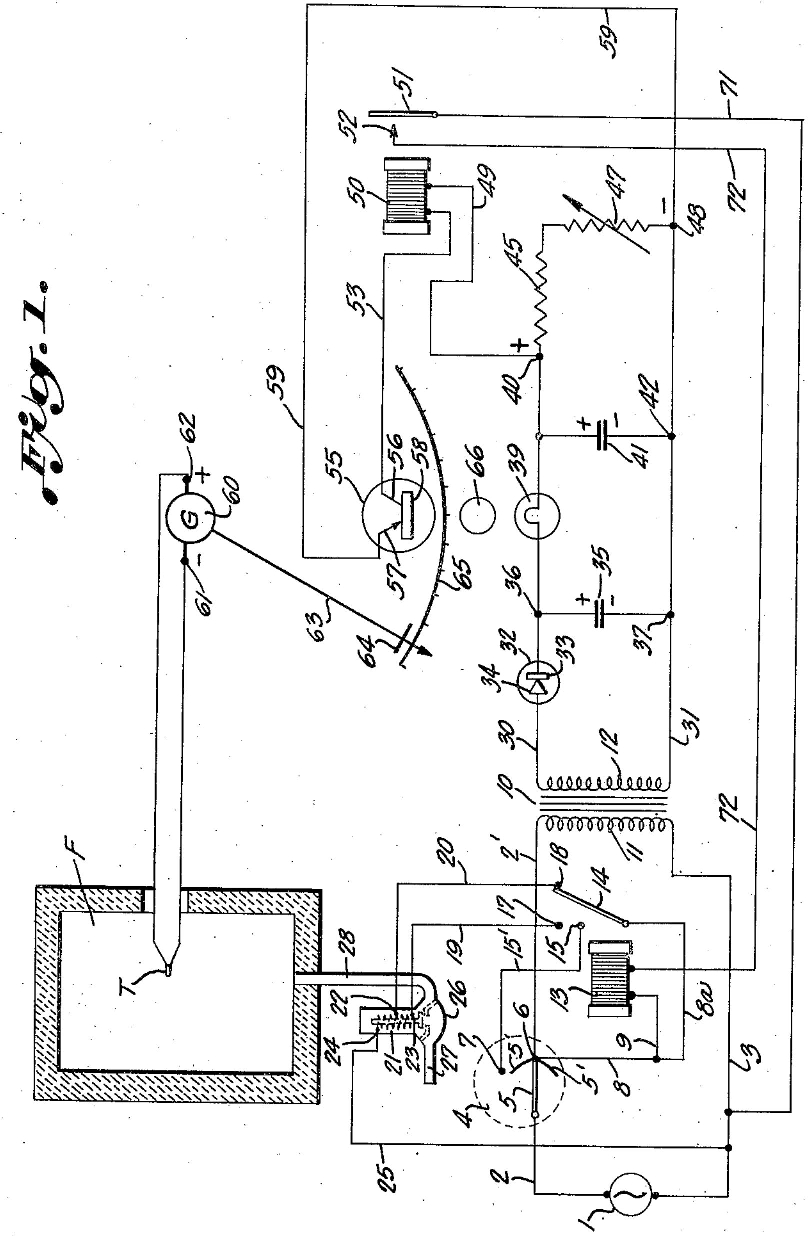
INVENTORS
JOHN P. POMPETTI
MARIO B. TATONETTI
BY [signature]
ATTORNEY

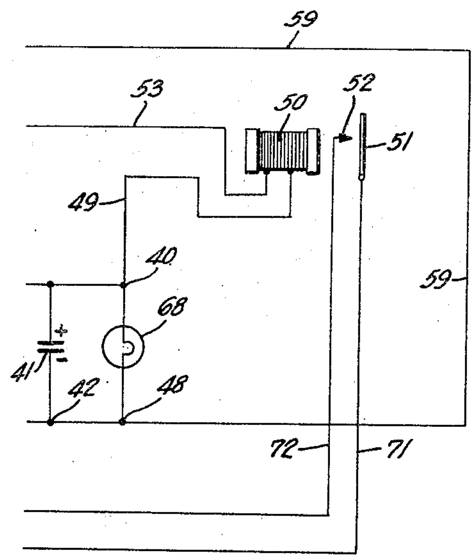
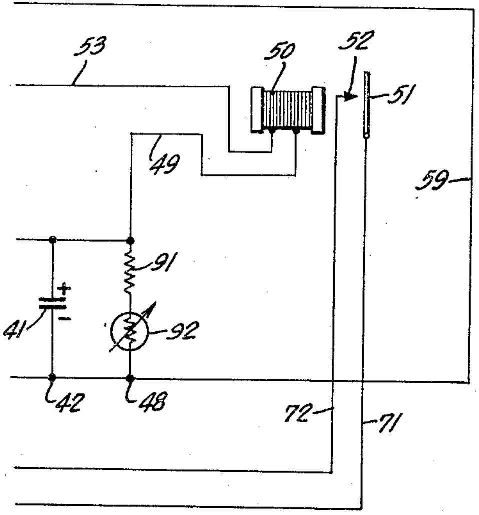
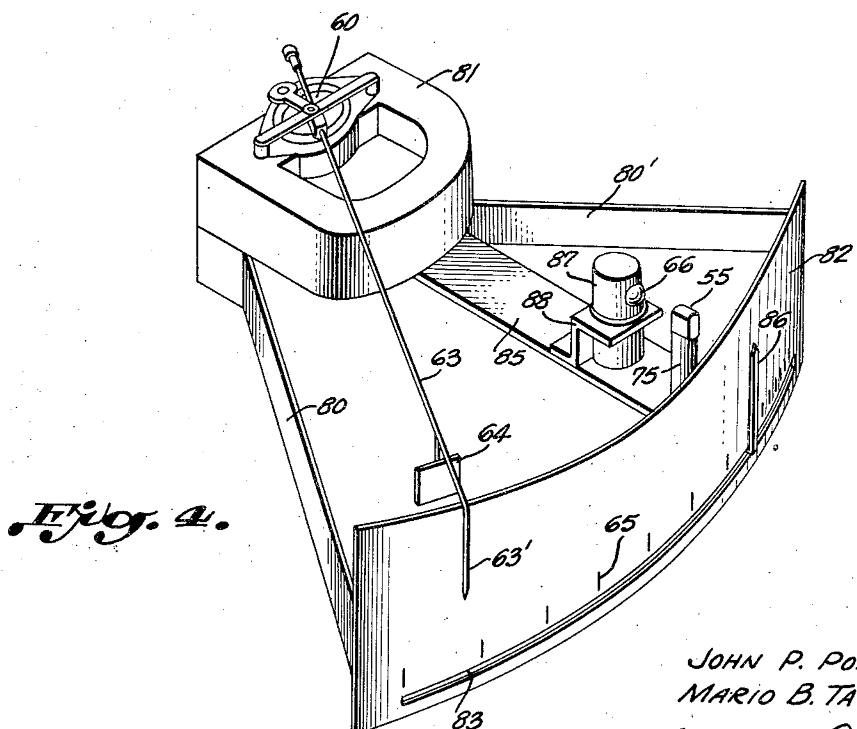
Fig. 4.
INVENTORS
JOHN P. POMPETTI
MARIO B. TATONETTI
BY
ATTORNEY Oct. 9, 1956 J. P. POMPETTI ET AL 2,765,986
PHOTO-TRANSISTOR CONTROL SYSTEM
Filed July 11, 1955
3 Sheets-Sheet 3
Fig. 5.
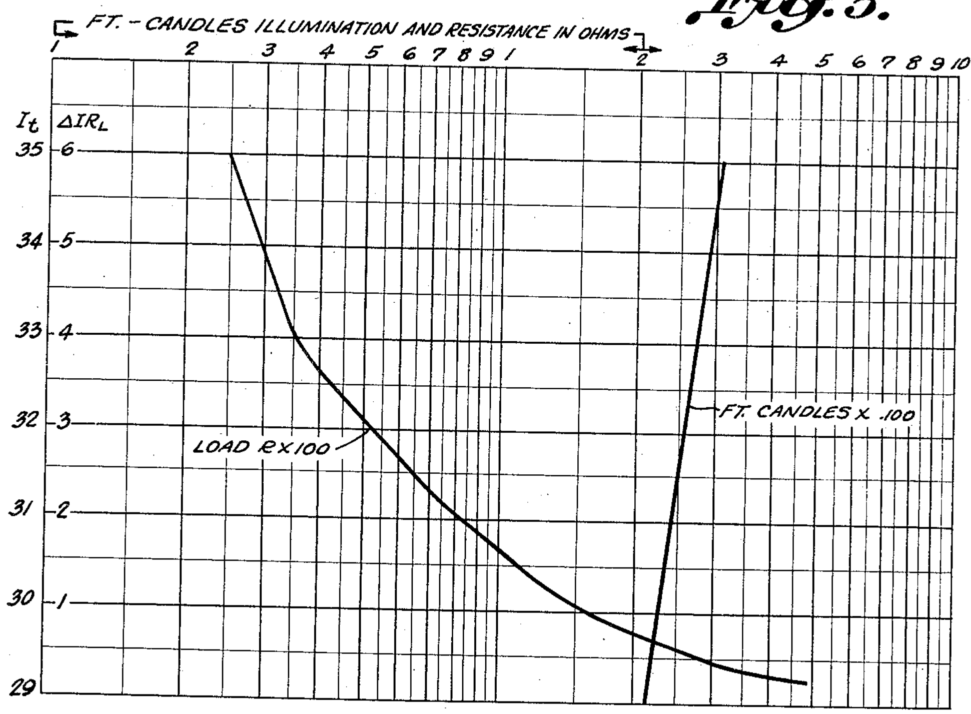
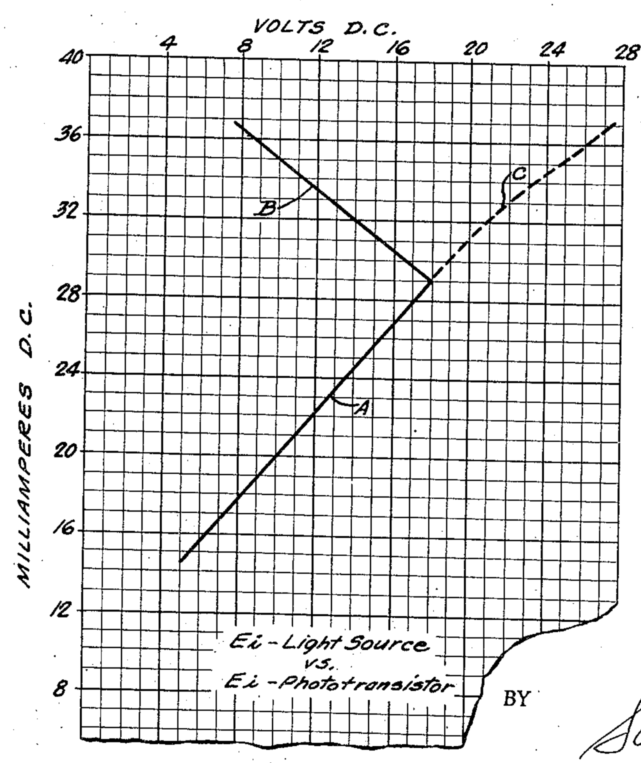
Fig. 6.
INVENTORS
JOHN P. POMPETTI
MARIO B. TATONETTI
BY Samuel Elson
ATTORNEY United States Patent Office 2,765,986

Patented Oct. 9, 1956

2,765,986

PHOTO-TRANSISTOR CONTROL SYSTEM

John P. Pompetti, Folsom, and Mario B. Tatonetti, Springfield, Pa., assignors to Cybertronic Corporation of America, Philadelphia, Pa., a corporation of Pennsylvania Application July 11, 1955, Serial No. 521,070

12 Claims. (Cl. 236—69)

This invention relates to automatic controls, and more particularly to automatic controls utilizing D'Arsonval microampere movements, in conjunction with a photo-transistor and incorporating feed-back through an optical system to give a closed loop circuit suitable for use in various process industries, wherein physical conditions such as temperature, percentage of hydrogen ion concentration, volts, amperes and other physical measurements have to be maintained constant or limited to specific values, and because of the nature of the processes involved, these automatic controls should perform with the utmost of reliability, sensitivity, and with a stable longevity characteristic.

Instrumentalities of the prior art, such as contactless type of indicating controls, utilize a vane attached to a pointer of a microampere movement. This vane passes between two coils which are connected to a grid tank circuit or a plate tank circuit of a thermionic vacuum tube oscillator. The action of said vane upsets a static characteristic of the circuit to actuate a secondary control element. The above-mentioned type of device, although excellent as an illustrative thermionic tube type of control, suffers from several disadvantages, namely, the delay involved by the inherent characteristic of the thermionic tube requiring an initial warm-up period, the need for automatic regulation to overcome line voltage variations, the predominant possibility of shorted elements, and the possibility of microphonics influencing the characteristic of the circuit. These problems influence the ultimate design as well as the performance of this type of instrument.

Another type of contactless control utilizes a lead sulphide photoelectric cell in combination with a magnetic amplifier to obtain the desired effect. The disadvantage of this type of system is the fact that a lead sulphide type of cell must have a relatively large actuating area in order to produce variations of the input circuit. In practical applications, these cells are of a small area, therefore requiring further amplification. The art is well acquainted with the characteristic difficulties involved in depositing photo-conductive surfaces with uniformity; the result of this non-uniformity is that if the actuating light source is replaced, the control point characteristic changes considerably. The disadvantage of using a magnetic amplifier in combination with a lead sulphide cell is the comparatively large currents which are required. These currents must be direct current in order to saturate the core materials of the magnetic system. As a result, selenium rectifiers are used and long term stability becomes an important factor, for as a selenium rectifier ages, the tendency is to change its direct current output considerably.

It is accordingly an object of this invention to provide a new and improved control instrument that will control such variables as temperature, pH factors, and pressure with substantially improved reliability, sensitivity and longevity.

Another object of the invention is to provide a control which will avoid the use of thermionic vacuum tubes, or the need for a warm-up period for the instrument.

Another object of the invention is to provide a control that does not require the use of saturable core type amplifiers for amplification.

A further object of the invention is to introduce feed-back in the form of an anticipating condition for the control system.

A further object of the invention is to provide a temperature compensation for a semi-conductivity photo-device, wherein the compensation is self-induced.

A still further object of the invention is to provide a control that will use only one supply voltage.

Another object of the invention is to provide a control utilizing a light source having extremely long life, with a monitored failure arrangement.

Another object of the invention is to obtain power gain in a transistor circuit by means of an optical feed-back circuit.

In the specific embodiments shown, the present invention comprises a means of incident radiation; a means of varying this incident radiation intensity; another independent means of controlling the level of incident radiation intensity concurrent with varying the incident radiation intensity to stabilize and increase the response of a photo-conductive-transistor, having an input circuit whose effluence or agitation of negative particles is changed by the variation of incident radiation intensity; an output circuit, whose electrical conductivity is changed by the relatively small energy changes present in the input circuit; and in series with the output circuit of the aforementioned photo-conductive transistor, an electro-responsive means wherein, as the current flow is varied, mechanical action is made to control the physical condition which is affecting the means of varying the incident radiation intensity.

A novel feature of the invention is that the incident radiation intensity can be varied by an instrument of the D'Arsonval galvanometer type movement which would not necessarily require the use of a metallic vane or any vane whatsoever. Should a vane be required, it could be made of any semi-opaque or opaque material. Another novel feature of the invention lies in the fact that as the mechanical means of decreasing the incident radiation intensity approaches the photo-sensitive area of the aforementioned photo-conductive transistor, the level of incident radiation intensity is further decreased automatically by lowering the electrical power fed to the source of incident radiation.

Other objects and purposes will appear from the detailed description of the invention following hereinafter, taken in conjunction with the accompanying drawings, wherein Fig. 1 is a schematic diagram of a preferred embodiment of the invention;

Fig. 2 illustrates a second embodiment of the circuit presenting a variation of the resistance network in parallel with the control relay;

Fig. 3 is a third embodiment of the circuit presenting another variation of the resistance network in parallel with the control relay;

Fig. 4 is a perspective view illustrating the physical arrangement of the parts for obtaining adjustable settings of the control system;

Fig. 5 is a graph showing the change of incident light radiation intensity with a change in load current; and Fig. 6 is a graph showing the compensating effects of load current for a change of incident light radiation.

In Fig. 1 of the drawings is shown a control system in accordance with the invention applied to a heating furnace F of any type, for example, a kiln or open hearth furnace, the temperatures of which are sought to be maintained at predetermined levels as determined by a thermocouple T positioned at some suitable part thereof. The control system may be energized from a source of alternating current 1 which may be a conventional power line of 110 volts and 60 cycles. Leads 2 and 3 are connected to the power supply and energize the primary winding 11 of a stepdown transformer 10 by the interposition of a switch 4 in the lead 2. The switch 4 is provided with an armature 5 and selective contacts 6 and 7. For continuous automatic regulation the armature 5 is maintained in contact with terminal 6, as shown in Fig. 1, but for discontinuous operation the armature 5 may be switched into contact with terminal 7. To enable this dual mode of operation, switch 4 is of a special design known as a "make before break" switch, which may include supplemental armatures or feelers 5′ forming part of armature 5 which makes contact with terminal 7 before the circuit is interrupted at terminal 6. This mode of operation will be explained in detail hereinafter.

As shown in Fig. 1, the furnace F may be heated in any known manner such as by solid, liquid or gaseous fuels, electricity, etc., but for the sake of illustration, the furnace is shown fired with a fluid fuel entering the furnace through conduit 28 which is fed from the inlet conduit 27 through a control valve 26 embodying a solenoid or other form of motor for variably controlling the amount of fluid passing into the furnace.

A power relay 13 is connected across the power leads 2 and 3 by means of conductor 8 extending from lead 2 at terminal 6 through conductor 9, power relay 13, conductor 72 and contact 52, and armature 51 of a control relay 50, conductor 71 and lead 3. This circuit is completed to energize relay 13 when control relay 50 is energized to attract armature 51 to contact 52, but is de-energized, as shown in Fig. 1, when contact 52 is spaced from armature 51. In the de-energized state of power relay 13, the armature 14 thereof may be in circuit with a portion of the winding of the solenoid 21 of control valve 26 to maintain the valve in partially opened position in order to fire the furnace at a low heat. On the other hand, if low level operation is not desired, contact 18 may be disconnected from the circuit and may be a "dead" contact. The circuit for the valve may be traced from leads 2, 2′, conductors 8, 8a, armature 14, contact 18, conductor 20 to tap 22 of solenoid valve 21, end terminal 24 of the solenoid valve and conductor 25 to lead 3 of the power supply. When the power relay is energized, as explained hereinafter, armature 14 is attracted to close the circuit of the armature 14 with contact 17 which is connected to the end terminal 23 of the solenoid relay to open the valve more fully and thereby to energize the furnace to a greater heat, which is at the level sought to be maintained by the control system of the instant invention. The operation of the control valve at high capacity is initiated immediately upon the energization of the control relay 50 which is effected by the energization of the control circuit connected to the secondary winding 12 of the transformer 10.

Leads 30 and 31 extend from the secondary winding 12 and the lead 30 extending from the upper end of the secondary winding 12 is connected to an anode 34 of a diffused junction germanium rectifier 32 having a cathode 33. This unit may be a germanium transistor, type 1N91, which is characterized by a high degree of stability and non-aging properties. This rectifier serves to rectify the reduced voltage at the secondary winding of the transformer which, for the sake of illustration, may be assumed to deliver 34 volts at 100 milliamperes.

An electrolytic condenser 35 is connected between the junctions 36, 37 of the leads 30 and 31, respectively, beyond the rectifier 32 which serves to smooth out the pulsating direct current beyond the cathode 33 of the rectifier.

Another electrolytic capacitor 41 is connected across junction points 40 and 42 of leads 30 and 31, respectively, which may be of the same capacity as condenser 35, for example, 50 microfarads and 50 working volts, D. C.

A source of incident light radiation, which may be in the form of a tungsten filament lamp 39, is connected in lead 30 between the junction points 36 and 40. This lamp may be of the type which requires a small current value and a medium voltage drop to supply approximately 1 candlepower as a percentage of the source of incident radiation intensity. The lamp 39 may be type 24X, having a rating of 24 volts, 35 milliamperes. The location of the tungsten filament lamp 39 at this point of the control circuit is responsible for many unique functional results, one of which is the fusing function afforded thereby in consequence of its failure. For example, should lamp 39 become inoperative due to the tungsten filament evaporating, the circuit responds to the lamp failure by deenergizing realy 50, which in turn deenergizes relay 13, removing power or fuel from the furnace 22, until a new lamp 39 is inserted in the circuit.

In addition to the two electrolytic condensers which are connected across the leads 30 and 31 of the secondary winding of the transformer, to function as a pi-type capacity input filter, a resistance network, consisting of a fixed resistance 45 and a variable resistance 47, is connected between positive junction 40 and negative junction 48 in leads 30 and 31, respectively. The resistance 45 may be a composition resistor of 500 ohms and 1 watt capacity, whereas variable resistance 47 may be a variable trimmer potentiometer of 200 ohms and 1 watt capacity.

The control circuit traced thus far is connected to one end of the control relay 50 by conductor 49 extending from positive junction 40, the opposite end of which is connected to conductor 53 leading to the collector electrode 56 of a germanium photoconductive transistor 55. The transistor 55 is provided in addition with a base electrode 58 which is left unconnected, and with the emitter electrode 57 which is connected to conductor 59 extending back to negative junction 48 in lead 31 of the control circuit. Thus, the circuit, including the control relay 50 and the electrodes 56 and 57 of the photo-transistor 55, are in parallel with the resistances 45 and 47.

The germanium photoconductive transistor 55 may be of the type disclosed in the U. S. Patent to Shive, No. 2,560,606, July 17, 1951, and may be of the commercial form designated X–25, X–25B or 10B. The phototransistor 55 is in optical alignment with the source of incident light radiation as embodied in tungsten filament lamp 39, the light from which is focused onto the phototransistor by means of the spherical lens 66 of translucent or clouded Pyrex or other safety glass in order to diffuse the light emanating from the filament of the tungsten lamp and striking the photo-transistor 55 in the vicinity of the contact of the emitter electrode 57 with the base 58.

The physical arrangement and mounting of these parts is illustrated in Fig. 4 wherein is shown fixed bracket arms 80, 80′ extending from the magnetic frame 81 of a D'Arsonval galvanometer movement carrying a curved scale 82 at the free ends of the bracket arms. The scale 82 bears suitable indicia 65 adjacent to a slot 83 provided along the scale, for the purpose of setting a movable base 85, with which is connected a pointer 86, at a predetermined position on the scale to adjust the point of operation at which the control is sought to be effected. A post 75 is mounted on the base 85, at the upper end of which post is disposed the photo-transistor 55. Spaced therefrom on a suitable bracket 88 is a lamp housing 87 for enclosing the tungsten filament lamp 39, the rays from which extend therefrom and are focused by means of the lens 66.

The variable conditions in the furnace F, upon which a control is sought to be imposed, are transmitted to a translating device 60 which may be in the form of a D'Arsonval galvanometer movement having a negative terminal 61 and a positive terminal 62 representing the cold junction of the thermocouple having its hot junction disposed within the furnace. Thus, when the differential between the cold and hot junctions of the thermocouple become sufficiently great, the currents induced in the movement 60 cause the travel thereof in dependence upon this heat gradient. A needle 63 is connected to the movement 60 terminating in a pointer 63' which may cooperate with the scale 65 provided on the scale 82, and in addition, a shutter of opaque or semi-opaque material may be affixed to the needle 63 in position to interrupt the light rays issuing from the source of incident radiation 39 to the transistor 55. The extent of movement experienced by the needle 63 before this interruption occurs, depends upon the setting of the arm 85 with respect to the scale 82 and the indicia 65 thereon, and serves to fix the point at which the temperature of the furnace may be maintained constant in the illustrated embodiment of the invention.

As shown in Fig. 1, the free passage of the light rays from lamp 39 onto photo-transistor 55 results in the flow of current through relay 50 to the collector electrode 56 and emitter electrode 57, back through conductor 59, across the rectified direct current energy supplied from the secondary 12 of transformer 10, which is sufficient to energize this control relay. This immediately causes the closure of the armature 51 and contact 52 of relay 50 to complete the circuit of relay 13 which becomes energized to shift armature 14 from its low heat operating contact 18 to its high heat operating contact 17. As the temperature of the furnace rises, the translating device 60 is energized until the needle 63 moves to block or impede the light rays extending from light source 39 to photo-transistor 55.

The shutter 64 produces two effects as it partially eclipes the photo-sensitive circuit. First, it decreases the level of luminous flux by means of a decrease in the load current, and secondly, the shutter 64 reduces the actual incident light intensity of the light source 39 by means of blocking of the light. This action decreases the current flow from positive junction 40 through relay 50 and collector electrode 56 and as the current decreases the relay reaches a drop-out point. This point coincides with the previous indexing of the optical system, namely, the positioning of the pointer 86 relative to the scale 65. The arm 51 of relay 50 opens the circuit of power relay 13 which results in the movement of armature 14 from its contact 17 back to its low heat contact 18. Of course, as stated above, instead of connecting contact 18 to a tap 22 of the solenoid valve 21, it may be disconnected from the solenoid valve, so that the feed of fuel to the furnace may be entirely interrupted. The cessation or reduction of fuel feed results in a cooling of the thermocouple T which reduces the voltage generated in the movement 60 and the retrograde movement of the needle 63 and the shutter 64 connected thereto. As the shutter 64 o rneedle 63 moves down scale, the incident radiant intensity increases by virtue of the fact that the light source 39 is no longer eclipsed by the shutter 64, and concurrent with this the level of luminous flux is increased by increasing the conductivity of the emitter-collector circuit.

The current in this circuit rises to a high level and the relay 50 is again energized to complete the energization of the relay 13 and the shifting of the arm 14 to its contact 17, which increases the amount of fuel fed to the furnace F. As the temperature of the hot junction again increases, the shutter 64 or indicating pointer again moves into the area of optical control. This cycling action continues and maintains a constant temperature in the combustion chamber of the furnace.

The control system shown in Fig. 1 is also adapted to control the fuel supply until a predetermined temperature is reached, and thereafter to cut off the power from the control system. This is made possible by the use of the special "make before break" switch 4 which was mentioned briefly heretofore. With such a mode of operation, the armature 5 first makes contact with the terminal 6 to activate the light source 39 and thereby to energize the control relay 50 which effects a closing of the circuit to the power relay 13 in consequence of the closure of the armature 51 and contact 52. The energization of the power relay 13 attracts armature 14 which may not only complete the circuit of the solenoid valve 21 at contact 17, but also closes a circuit of the armature 14 with the contact 15 which leads to the terminal 7 of switch 4 by way of conductor 15'. Thus, the control system is set for high heat supply which remains unaffected as the switch armature 5 is shifted from its terminal 6 to terminal 7, and by virtue of the feelers 5' at the end of armature 5, the circuit across the switch to terminal 7 is completed before the same is broken at terminal 6.

As a result of this mode of operation there is no interruption to the energization of the primary winding 11 of the transformer 10, since the circuit to the winding 11 may now be traced from source 1, lead 2, armature 5 of switch 4, terminal 7, conductor 15', contact 15, armature 14, conductors 8*a*, 8 and 2' to the upper end of the primary winding and back through lead 3 to the opposite end of the power source 1. Also, the power relay 13 is now energized from lead 2, armature 5, contact terminal 7, conductor 15', terminal 15, armature 14, conductors 8*a* and 9 to the left end of power relay 13 and from the opposite end of the power relay through conductor 72, contact 52, armature 51, conductor 71 back to lead 3 and the opposite end of the power source 1.

This situation obtains until the interception of light rays to the photo-transistor by the shutter 64 causes a diminution of the current through the control relay 50 which, upon opening of the circuit at 51, 52, results in a deenergization of power relay 13 and when armature 14 drops away from contacts 15 and 17, the solenoid valve 21 is deenergized and the power supply to the transformer 10 is broken, which inactivates the light source 39. This deenergization is not affected by the retrograde movement of the shutter 64, and in order to place the system into operation again, the power supply must be connected at point 6 of switch 4. This is done by moving the arm 5 of switch 4 from contact 7 to contact 6 in order to apply power to the transformer 10 to energize the lige source 39. This switching action must be accomplished manually.

The resistance network 45, 47 at the output of the rectifier and filter circuit and in parallel to the control relay and photo-transistor circuit lends itself to variation in order to obtain different operating characteristics. With respect to the arrangement shown in Fig. 1, the limiting resistor 45 and variable resistor 47 are so positioned as to set an initial current value through the lamp 39 with no other external load. The purpose of the limiting resistor 45 is to prevent an excess of current being drawn through lamp 39. The current drawn by this bleeder network 45, 47 is preferably on the order of approximately five times the expected load current drain.

The initial intensity for the light source 39 is determined by setting the variable resistance 47 so that the current flowing through the former, plus its voltage drop, will equal one candle-power with the indicator needle 63 out of the control area. In the illustrated embodiment, this current value amounts to 29 milliamperes. The external load circuit, consisting of the relay 50 and the photo-transistor 55 connected at the positive junction point 42, draws 6 milliamperes with the photo-transistor exposed to full illumination. The total drain equals 35 milliamperes at 24 volts across the light source 39. As the indicating pointer 63 or shutter 64 moves into the vicinity of the focused light source, the current through the photo-transistor 55 emitter-collector circuit decreases. As the current decreases, the luminous flux decreases. An initial value of illumination which was established at 300 foot-candles changes at a rate of 2% per each previous level, for each one-half milliampere change of the external load circuit, per each one thousandth of an inch lineal motion of the D'Arsonval indicating system.

The photo-transistor 55 has a sentitivity of 50 percent resistance change per each 10 foot-candle change. A 2% change at each level of illumination is equal to a 25% change in dynamic resistance of the photo-transistor 55. This is added to the lineal change caused by the motion of the movement 60. When the current flowing through the emitter-collector circuit 57 and 56 falls to a value of approximately 2.5 milliamperes, the relay 50 is deenergized.

As the pointer 63 or shutter 64 moves away from the optical set point, the illumination increases by the same factor as it decreased. Therefore, when the indicating pointer 63 is approaching the optical set point, the load change creates a degenerative effect on the intensity of illumination. This aids the action of motion and direction for the indicating pointer. As the pointer goes in the opposite direction, the illumination increases. This produces the effects of a regenerative action and again aids the function of the indicating pointer.

Thereby, increasing the level of luminous flux such that the combined lineal motion of the pointer 63 or the shutter 64, plus the current increase of the external circuit, aid in reaching a level of 4 milliamperes, which corresponds to the pull-in current of the relay 50.

Referring to Fig. 5 wherein is presented the graphic representation of the circuit action, it denotes the total current flowing through the tungsten filament lamp 39. Delta I is that current which flows through the external load circuit. The load line is that load characteristic of the photo-transistor 55, the level of illumination being represented by the linear line designated foot-candles times 0.100. It may be pointed out that the advantages of this circuit lie in the fact that in order to increase the sensitivity of the system it would necessitate further amplification. Because of the degenerative and regenerative action of the circuit, it becomes practical to operate the control relay 50 located in the collector circuit of the photo-transistor with an increase of 30% over the actual sensitivity of the circuit. This, therefore, allows us to de-rate the tungsten filament lamp such that when the needle 63 or shutter 64 is in the control region, the filament voltage is 90% of its rating.

As the lamp is rated at 3000 hours life expectancy, a reduction to 90% of applied voltage will lead to an increase of life expectancy of 430%.

The foregoing explanation of varying the tungsten filament lamp 39 current is rather simple. However, a further disclosure as to the basic physical laws involved should also be considered. The inventors realized that by varying the power fed to the incident radiation source 39 one could change the operating temperature, the emissivity, and the spectral distribution of the tungsten filament lamp.

With a change of absolute temperature and emissivity there is a change in spectral distribution and total incident radiation. This is expressed in a gross parameter relationship by the Stephan-Boltzman law $W=e\rho T^4$. This is sufficient to explain the relationship of incident radiation as a function of emissivity and temperature, so by controlling the Kelvin temperature $T^4$ and the emissivity factor $e$ (black body equal to unity), we are able to vary the radiant energy per unit area, as the Stephan-Boltzman constant $\rho$ remains fixed.

The photo-transistor varies a portion of this absolute temperature in the lamp to give a change in Kelvin temperature. This change in Kelvin temperature also brings about a change in emissivity, for as the Kelvin temperature increases, the emissivity approaches unity. There is also a spectral shift as defined by the Wein Displacement Law wherein the wave-length of maximum spectral emissivity is inversely proportional to the Kelvin temperature. Plotting these values for the tungsten filament lamp 39 and having the spectral response of the photo-transistor 55, an operating temperature for the tungsten filament lamp is derived.

This temperature is maximum and corresponds to the total available radiation focused on the photo-transistor. A second Kelvin temperature is derived, and this conforms to a point where the relay is to drop out. A third Kelvin temperature is automatically changed over the range of the first to the second Kelvin temperature, this being determined by the amount of optical interference causing a change in the collector-emitter current of the photo-transistor 55, and never reaches a point equal to the first Kelvin temperature derived. The advantages become apparent as the change in interference level is proportionately changing the black body temperature, emissivity and spectral distribution of the tungsten filament lamp, as well as changing the effluence of negative particles in the base-emitter junction of the photo-transistor 55. It is evident that since the temperature coefficient of the photo-transistor is negative, an increase in current through the collector-emitter circuit due to a change in resistance of the base-emitter junction because of temperature, will result in an increase of Kelvin temperature and emissivity at the level of the second derived Kelvin temperature and, as a result, a new level for the third Kelvin temperature (which is only a small part of the first derived Kelvin temperature) is approached. The effect is such that as long as the spectral response of the photo-transistor is complementary to the spectral distribution of the tungsten filament lamp, compensation will take place if proper proportions are observed.

The photo-transistor 56 has a spectral response curve whose maximum wave length is 1.5 microns. The tungsten filament lamp 39 is initially adjusted by potentiometer 47, to a Kelvin temperature of 1900°. This temperature is a result of the power dissipated by the tungsten filament lamp 39, as the product of the currents drawn by the potentiometer 47, and the photo-transistor 56, and the voltage drop across the tungsten filament lamp 39.

The Wien Displacement Law of shift of radiation maxima with temperature for a black body curve is as follows:

$$\lambda_m=\frac{a}{T}$$

where λ (lambda) is the peak wavelength, in microns, of the spectral distribution curve, $a$ is a constant equal to 2897 micron degrees, and T is the absolute temperature of the radiating body (degrees Kelvin). Substituting 1900° Kelvin for T in the above equation the maxima of the spectral distribution curve is 1.51 microns.

The vane 64, moving into the radiating field decreases the current drawn by the photo-transistor to a value that the tungsten filament lamp operates at 1650° Kelvin. This second Kelvin temperature is the true operating point of the system. Substituting the second Kelvin temperature in the equation $$\lambda_m=\frac{a}{T}$$

we obtain a spectral peak of 1.75 microns.

If the ambient temperature rises 50° C., the phototransistor 56, would normally detect this change as a variation of radiation intensity and decrease the output current as a result of the decrease in the base-emitter voltage at the photo-sensitive junction. However, the ambient temperature change of 50° C. is analogous to a spectral shift of less than 0.05 micron and a negative shift of −50° C. will result in a spectral shift of less than 0.075 micron. The result is that for an ambient range of 100° C. we have a change of +0.05 and −0.075 micron about a mean value of 1.5 microns which is on the flat portion of the spectral response of the photo-transistor whose relative energy level is 70 percent down at 0.5 micron, 100 percent from 1 micron to 1.51 microns, and 75 percent down at 1.7 microns.

Figs. 2 and 3 show variations of the resistance network 45 and 47 in the control system illustrated in Fig. 1. Fig. 2 illustrates a modification of the resistance network to maintain a constant level of illumination. In lieu of the fixed limiting resistor 45 and adjustable potentiometer resistor 47, a tungsten filament lamp 68, having the same characteristics as the series tungsten filament lamp 39, is connected between the positive junction 40 and negative junction 48 of the control circuit. The voltage applied at point 40 is such that the lamp 68 draws only 28 milliamperes with a potential of 17 volts. The total current through the tungsten lamp 39 is now in the order of 34 milliamperes and the voltage drop across lamp 39 is equal to 24 volts. As the shutter 64 or the pointer 63 comes to the vicinity of the control area, the current through the emitter-collector circuit decreases and the voltage at point 42 increases. As this voltage increases, the current through the lamp 68 increases. This in turn draws more current through the tungsten filament lamp 39 which is in series with the load. The proportionate current change for the photo-transistor circuit will keep decreasing, but the tungsten filament lamp 68 will increase its current over a range such that the voltage drop across the tungsten filament lamp 39 will remain constant, therefore the current through the lamp 39 will also remain constant. The power dissipated through lamp 39 will likewise remain constant and the luminous flux output of lamp 39 will remain constant because of this constant power dissipation. This may be clarified by referring to Fig. 6 wherein a graphical presentation depicts the elements just explained.

The solid line A represents the current drawn by the tungsten filament lamp 68 (which also appears in the other tungsten filament lamp 39), and the dotted line C represents the total current appearing through the series tungsten filament lamp 39 when full load current is drawn. The intersecting line B represents the load current alone. As can be seen when the load current varies, the current represented by dotted line C will also vary. The effect is that as the load B decreases, the curve C will increase equally and the voltage will increase proportionately across the tungsten lamp 68, which will subtract from what might have been an increase in voltage across the series filament lamp 39. The effect is such that there is no regenerative or degenerative action in the system. The pointer 63 or shutter 64 will actuate the circuit by blocking or interfence motion alone.

Fig. 3 shows a third embodiment of a resistance network connected across the positive junction 40 and the negative junction 48 of the control system shown in Fig. 1, whereby greater current variations through lamp 39 may be obtained than by the system shown in Figs. 1 and 2. In this case, a non-linear resistance element 91, of Thyrite, for example, or a thermistor 92, may be used in place of the tungsten filament lamp 68 shown in Fig. 2. While Fig. 3 shows both of these special resistors in the control circuit, either one may be used to the exclusion of the other. By the provision of such a special resistor 91 or 92, the current change would then be governed by the voltage coefficient in the case of a Thyrite resistor, or by a temperature coefficient in the case of a thermistor. In both cases the materials used are of such a composition that the resistance change varies as an exponential rather than as a linear function as expressed by Ohm's law.

The system described above is directed to the control of temperatures, the variations of which are evidenced by suitable instruments for that purpose. The system could as well be applied to an industrial installation requiring predetermined pressures, the variations of which are evidenced by suitable pressure gauges. Likewise, controls for chemical processes of all types and the maintenance of other physical characteristics in all technical fields may utilize the control scheme disclosed herein.

While we have described our invention as embodied in a specific form and as operating in a specific manner for purposes of illustration, it should be understood that we do not limit our invention thereto, since various modifications will suggest themselves to those skilled in the art without departing from the spirit of our invention, the scope of which is set forth in the annexed claims.

We claim:

1. In a control system, a source of alternating current, means for controlling a variable condition by said alternating current, a translating device responsive to said condition, a control circuit energized by said alternating current and adapted to control said first-mentioned means by the operation of said translating device, said control circuit comprising a transformer secondary winding, a solid electric rectifier in one of the leads from said winding, a pi-type capacity input filter for smoothing the rectified pulsating energy and comprising a pair of spaced condensers across said secondary winding, a light source between said condensers in said one lead, electrical resistance means, in parallel with a control relay and series photo-transistor, connected to the output of said filter across said secondary, said photo-transistor being in optical alignment with said light source, light-modifying means connected to said translating device and operable within the optical field between said light source and photo-transistor, said control relay being variably responsive to the currents flowing in said circuit during the clear and modified optical field between said light source and photo-transistor for controlling said first-mentioned means.

2. A control system as set forth in claim 1 wherein the solid electric rectifier is a germanium diffused junction transistor.

3. A control system as set forth in claim 1 wherein the light source between said condensers is a tungsten filament lamp and the electrical resistance means is composed of a fixed resistance to limit the current through the lamp and a variable resistance to adjust the luminous intensity thereof.

4. A control system as set forth in claim 1 wherein the light source between said condensers is a tungsten filament lamp and the electrical resistance means is composed of a tungsten filament lamp having the same characteristics as the light source whereby the illumination level and spectral distribution of said light source is maintained substantially constant.

5. A control system as set forth in claim 1 wherein the light source between said condensers is a tungsten filament lamp and the electrical resistance means is composed of a resistance material varying exponentially with the voltage impressed thereon.

6. A control system as set forth in claim 1 wherein the light source between said condensers is a tungsten filament lamp and the electrical resistance means is composed of a thermistor material, the resistance of which varies exponentially as a function of its temperature.

7. In a control system, a source of alternating current, means for controlling a variable condition by said alternating current comprising a power relay and means responsive to the energization of said power relay for activating said condition, a translating device responsive to said activated condition, a control circuit energized by said alternating current and adapted to control said first-mentioned means by the operation of said translating device, said control circuit comprising a transformer having a primary and secondary winding, a solid electric rectifier in one of the leads from said secondary winding, a pi-type capacity input filter for smoothing the rectified pulsating energy and comprising a pair of spaced condensers across said secondary winding, a light source between said condensers in said one lead, electrical resistance means, in parallel with a control relay and series photo-transistor, connected to the output of said filter across said secondary, said photo-transistor being in optical alignment with said light source, light-modifying means connected to said translating device and operable within the optical field between said light source and photo-transistor, said control relay being variably responsive to the current flowing in said circuit during the clear and modified optical field between said light source and photo-transistor, and switch means operated by said control relay adapted to complete the circuit of said power relay in the energized position of said control relay and to interrupt the circuit of said power relay in the deenergized position of said control relay, said energized and deenergized states of said control relay corresponding to the clear and modified condition of said optical field.

8. A control system as set forth in claim 7 wherein a switch is connected to said source of alternating current for selectively permanently energizing the primary winding of said transformer and the light source connected to the secondary winding for successive energizations and deenergizations of said power relay or only temporarily energizing said primary winding and light source which are inactivated together with the power relay upon the initial deenergization of the latter.

9. A control system as set forth in claim 8 wherein said switch is of the "make before break" type requiring manual resetting following the temporary energization of said primary winding and light source.

10. A control system as set forth in claim 7 wherein said series photo-transistor comprises a three-terminal photo-sensitive semi-conductor having a collector electrode, an emitter electrode and a base electrode unconnected.

11. A control system as set forth in claim 10 provided with means for focusing the light emanating from said light source onto the area of said photo-transistor adjacent to said base and emitter electrode, said light modifying means being adapted to convert a small change in base-emitter current to a large change in collector-emitter current which affects the current passing through said light source and the voltage thereacross and across said electric resistance means.

12. A control system as set forth in claim 7 wherein the failure of said light source results in the deenergization of said power relay and the de-activation of said condition.

References Cited in the file of this patent

UNITED STATES PATENTS

| | | |
|---|---|---|
| 2,138,593 | Breitenstein | Nov. 29, 1938 |
| 2,167,484 | Berry | July 25, 1939 |
| 2,629,005 | Engelhard | Feb. 17, 1953 |
| 2,691,736 | Haynes | Oct. 12, 1954 |